Dec. 14, 1937.     W. G. DUNN     2,102,309
WIND DRIVEN GENERATOR STRUCTURE
Filed April 27, 1937
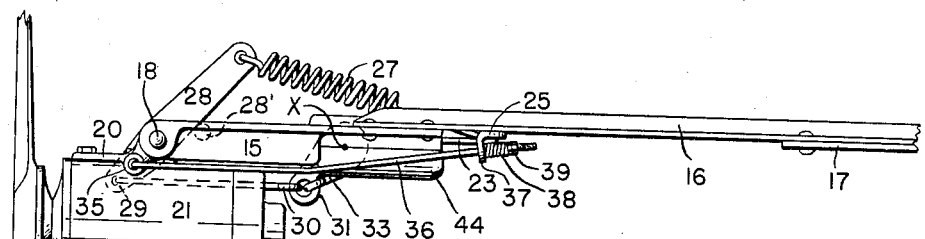
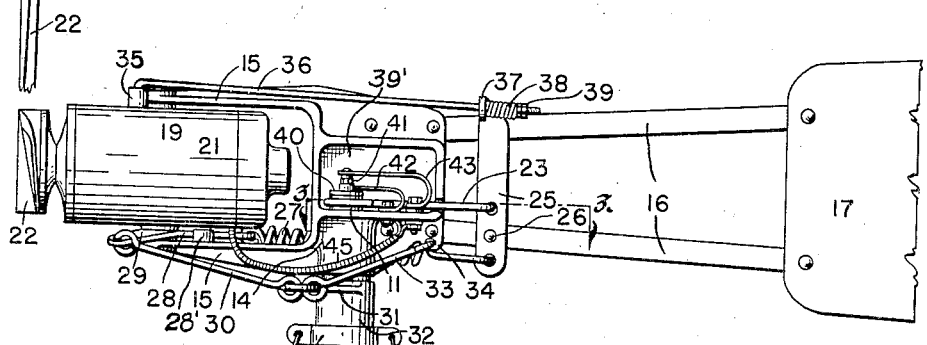
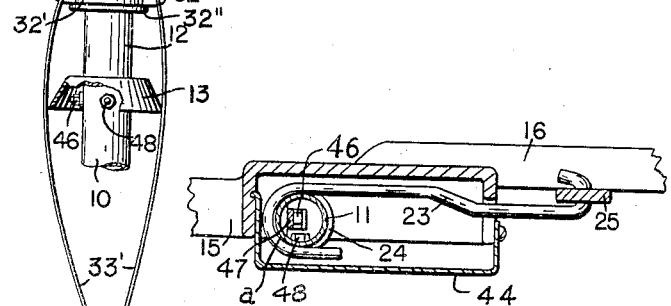
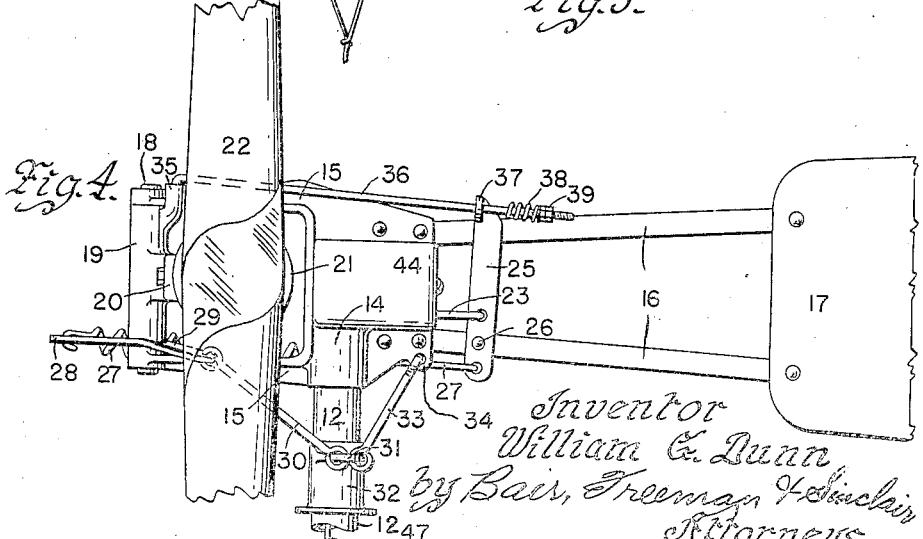
Inventor
William G. Dunn
by Bair, Freeman & Sinclair
Attorneys Patented Dec. 14, 1937

2,102,309

UNITED STATES PATENT OFFICE 2,102,309

WIND DRIVEN GENERATOR STRUCTURE

William G. Dunn, Clarinda, Iowa

Application April 27, 1937, Serial No. 139,225

23 Claims. (Cl. 290—55)

An object of my present invention is to provide a wind driven generator structure in which a generator is pivoted on a vertical axis so that it can be swung out of the wind by the pressure of the wind against the propeller of the generator when such pressure increases above a predetermined wind velocity.

Still a further object is to provide a wind generator in which the generator can throw sidewise instead of upwardly as in my Patent Number 2,052,816, means being provided for preventing the vane of the structure swinging out of the wind due to the gyroscopic action of the propeller instead of the propeller swinging out of the wind and the vane remaining therein.

A further object is to provide a side throw generator which is wind driven, and to provide an automatic brake mechanism effective to prevent rotation of the frame which supports the generator about the head or supporting post for the generator during the governing operation of the structure.

A further object is to provide an automatic release for the brake mechanism, which releases the brake mechanism when the generator is in a normal position due to less than a predetermined wind velocity.

A further object is to provide my structure so designed that a distributor mechanism can be associated therewith in a very simple manner, which does not require any adjustments or electrical connections during installation of the wind generator.

A further object is to provide a manual throw-out for a wind driven generator, which throw-out is operable to swing the generator on a vertical axis upon vertical movement of the throw-out device relative to the mast head.

With these and other objects in view, my invention consists in the construction, arrangement and combination of the various parts of the device, whereby the objects contemplated are attained, as hereinafter more fully set forth, pointed out in my claims, and illustrated in the accompanying drawing, in which:

Figure 1 is a plan view of a wind driven generator structure embodying my invention.

Figure 2 is a side elevation of the same.

Figure 3 is an enlarged sectional view on the line 3—3 of Figure 2; and

Figure 4 is a side elevation showing the generator in a swung back or inoperative position due to operation of the manual throw-out mechanism.

On the accompanying drawing I have used the reference numeral 10 to indicate a mast head which may be tubular in character and either supported on a mast or building (not shown). A tubular post 11 extends upwardly from the support 10 and has rotatably mounted thereon a sleeve 12. An inverted pan shaped terminal guard 13 is mounted on the upper end of the post 10 and serves as a stop for limiting downward movement of the sleeve 12 relative to the tube 11.

The sleeve 12 is screw threaded into a boss 14 of a Y-shaped frame, the arms of which are indicated at 15 and the leg of which constitutes a pair of angle bars 16 secured to the Y-shaped frame by rivets or the like.

A vane 17 is mounted on the leg 16 for normally maintaining the Y frame pointed properly relative to the direction of the wind.

A vertical pivot pin 18 is carried by the arms 15 of the Y frame and a hub 19 is pivoted thereon. The hub 19 has a foot 20 which is connected to a generator 21 for supporting the generator so that it is pivotally mounted relative to the Y frame 15. A propeller 22 is mounted on the shaft of the generator 21.

Brake mechanism is provided for preventing free rotation of the Y frame about its vertical axis or supporting post 11, comprising a hook rod 23 engageable in an annular groove 24 in the upper end of the post 11. The hook rod 23 is connected with a lever 25 pivoted at 26 to one of the angle bars 16.

A spring 27 connects the arm 25 to an arm 28 extending from the hub 19. A second arm 29 extends from the hub 19 and is connected by a link 30 to an arm 31 of a sleeve 32. The sleeve 32 is telescopically and rotatably mounted on the sleeve 12. The arm 31 is connected by a second link 33 to a perforated ear 34 of the Y frame. For pulling the sleeve 32 downwardly manually, a ring 32' is mounted thereon for engagement with a flange 32" thereof. A pair of wires 33' extend downwardly from the ring 32' to any convenient point where the wire can be pulled downwardly for rendering the wind structure inoperable as will hereinafter appear.

The hub 19 has a boss 35 which is connected by a link rod 36 to a perforated ear 37 of the lever 25. The rod 36 extends slidably through the ear 37 and has a spring 38 thereon engageable between the ear 37 and a pair of lock nuts 39 adjustably mounted on the rod 36.

The Y frame has a distributor box or distributor mechanism compartment 39' arranged above the hub 14. This compartment is adapted to be closed by a cover 44.

Within the compartment 39' distributor mechanism is provided, comprising a disk 40 at the top of the tube 11, with which a distributor brush 42 coacts. A nut 41 is insulated from the disk 40 and the tube 11, and a brush 43 coacts therewith. The brush 42 may be grounded, while the brush 43 is insulated relative to the Y frame.

These brushes are connected by suitable wiring 45 to the generator 21, while the disk 40 being grounded to the tube 11 is electrically connected to a ground terminal 48 under the terminal protector 13. A second terminal 46 is insulated relative to the supporting pipe 10 and connected internally of the tube 11 with the nut 41 by a strap 47 (see Figures 3 and 4).

*Practical operation*

In the operation of my wind driven generator, the spring 27 normally retains the arm 28 against a suitable stop 28', with the axis of the generator 21 substantially parallel to the vane 17. The spring 27 also exerts a tension tending to cause frictional engagement between the hook rod 23 and the groove 24 of the tubular supporting post 11. Such friction serves as a braking action except when the parts are in the position of Figures 1, 2 and 3, whereupon the rod 36 compresses the spring 38 and retains the arm 25 in the vertical position illustrated, so that there is a space between the hook rod 23 and the bottom of the groove 24 as indicated at *a* in Figure 3.

This release of the brake mechanism permits free swinging of the Y frame about its vertical pivot as the vane 17 responds to the direction of the wind. When the wind velocity increases to above a predetermined rate, the pressure of the wind against the propeller 22 will swing the generator 21 about its axis 18 in opposition to the spring 27. The first portion of this movement will release the spring 38 so that the spring 27 can swing the lever 25 to the position shown in Figure 4, thus closing the space at *a* and imposing frictional contact between the hook rod 23 and the post 11 under tension of the spring 27. This friction acts as a braking means to prevent rotation of the sleeve 12 about the post 11 and serves a very important purpose in connection with a generator mounted to pivot on a vertical axis, as herein disclosed, for governing operation.

It is intended, of course, that the vane 17 will remain in the proper direction as determined by the direction of the wind, and the generator 21 will swing out of the wind upon excessive wind pressure against the propeller.

However, due to the gyroscopic action of the propeller I have found that the propeller will remain in the same plane and rigidly face the wind, while the vane 17 will swing around toward the propeller if the frame of the machine is not held from such rotation by the braking action disclosed. In such a case, when the wind continues high, the vane will remain in the new position mentioned across the wind until the propeller slows down sufficiently to lose its gyroscopic forces, whereupon the wind pressure on the vane will then swing the whole machine out of the wind as first intended.

With the braking action disclosed, however, the Y frame is held from this undesirable rotation and as the wind pressure increases, the tension of the spring 27 likewise increases and so does the frictional engagement of the hook rod 23 with the post 11, all of which produces the desirable result of permitting the generator to be swung out of the wind instead of the vane 17 being so swung.

When the wind pressure again recedes to below the predetermined velocity necessary to swing the arm 28 from the position shown in Figure 1, the rod 36 serves to release the brake when the nuts 39 are adjusted to the position shown on the drawing. Thus the vane 17 is rendered operable to swing the frame, even in the slightest breeze.

If the nuts 39 are adjusted to less looseness, the spring 38 may be in a non-compressed position when the other parts are in the position of Figures 1 and 2, thus merely reducing the pressure of the hook rod 23 on the post 11, instead of eliminating its frictional engagement therewith. This would make the vane 17 non-responsive to such light winds that they would be insufficient to operate the generator but the wind pressure on the vane 17 could overcome this slight friction when the wind velocity increases to a degree sufficient for operating the generator.

I have found that offsetting the axis of rotation of the generator 21 from the axis of the post 11, which is indicated at X in Figure 1, and then offsetting the plane of the vane 17 from this axis, but on the opposite side from the generator axis, produces a better action of the generator in its self governing capacity than where the generator axis and supporting post axis fall in the plane of the vane 17. This is probably due to the tendency for the vane to be forced out of the wind by the side draft occasioned by the wind pressure against the propeller 22, the side draft being offset by arranging the propeller on the opposite side of the supporting post axis.

The hook rod 23 serves the purpose of retaining the Y frame and its sleeve 12 in position on the post 11 when the parts are once assembled together. It also prevents any possible movement of the Y frame upwardly to a position where the brushes 42 and 43 would not contact with the disk 40 and the nut 41, thus breaking the electric circuit.

The brushes 42 and 43 are preferably made of leaf spring material and are under tension against the disk 40 and the nut 41 to secure good electrical contact in all positions of rotation of the generator supporting frame relative to the supporting post, and the details thereof are more fully disclosed in my co-pending application, Serial Number 137,506, filed April 17, 1937.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a wind driven generator structure, a frame pivotally mounted on a vertical axis, a vane for maintaining said frame in a desired position relative to the direction of the wind, a generator pivotally mounted on a vertical axis on said frame, a generator shaft, a propeller on said generator shaft, a projection from said generator to a point spaced from the axis of the pivot mounting of the generator to the frame, a spring connected with said projection to normally maintain the shaft of said generator substantially parallel with the plane of said vane, a stop for said generator in such position and brake mechanism operative to prevent free rotation of said frame about its vertical axis when said generator is swung on its pivotal axis relative to said frame against the action of said spring by an increase of the wind velocity above a predetermined rate.

2. In a wind driven generator structure, a frame pivotally mounted on a vertical axis, a vane for maintaining said frame in a desired position relative to the direction of the wind, a generator pivotally mounted on a vertical axis on said frame, a generator shaft, a projection from said generator to a point spaced from the axis of the pivot mounting of the generator to the frame, a spring connected with said projection to normally maintain the shaft of said generator substantially parallel with the plane of said vane, a stop for said generator in such position and brake mechanism operative to prevent free rotation of said frame about its vertical axis when said generator is swung on its pivotal axis relative to said frame against the action of said spring by an increase of the wind velocity above a predetermined rate, said spring being operatively connected to said brake mechanism to increase the braking effect thereof as said generator swings further relative to said frame in response to increased wind velocity.

3. In a wind driven generator structure, a frame pivotally mounted on a vertical axis, a vane for maintaining said frame in a desired position relative to the direction of the wind, a generator pivotally mounted on a vertical axis on said frame, a generator shaft, a propeller on said generator shaft, a projection from said generator to a point spaced from the axis of the pivot mounting of the generator to the frame, a spring connected with said projection to normally maintain the shaft of said generator substantially parallel with the plane of said vane, a stop for said generator in such position, brake mechanism operative to prevent free rotation of said frame about its vertical axis when said generator is swung on its pivotal axis relative to said frame against the action of said spring by an increase of the wind velocity above a predetermined rate, and means to release said brake mechanism, said means being operated by said generator assuming its position against said stop.

4. In a device of the class described, a frame arranged in a vertical plane and pivoted on a vertical axis, extensions on said frame, a vane secured to one of said extensions and a generator pivoted to other of said extensions and thereby swingable relative to said frame on a vertical axis, means biasing said generator to remain with its axis of rotation substantially parallel to the plane of said vane, a generator shaft, a propeller on the generator shaft for rotating it and for swinging the generator out of the wind against such biasing force when the wind pressure against the propeller increases above a predetermined maximum, and means resisting pivotal movement of said frame about its vertical axis.

5. In a device of the class described, a frame arranged in a vertical plane and pivoted on a vertical axis, extensions on said frame, a vane secured to one of said extensions and a generator pivoted to other of said extensions and thereby swingable relative to said frame on a vertical axis, means biasing said generator to remain with its axis of rotation substantially parallel to the plane of said vane, a generator shaft, a propeller on the generator shaft for rotating it and for swinging the generator out of the wind against such biasing force when the wind pressure against the propeller increases above a predetermined maximum, and means resisting pivotal movement of said frame about its vertical axis, the effect of said means being increased in proportion to an increase of the wind pressure.

6. In a device of the class described, a frame arranged in a vertical plane and pivoted on a vertical axis, extensions on said frame, a vane secured to one of said extensions and a generator pivoted to other of said extensions and thereby swingable relative to said frame on a vertical axis, means biasing said generator to remain with its axis of rotation substantially parallel to the plane of said vane, a generator shaft, a propeller on the generator shaft for rotating it and for swinging the generator out of the wind against such biasing force when the wind pressure against the propeller increases above a predetermined maximum, and means resisting pivotal movement of said frame about its vertical axis, the effect of said means being eliminated when said generator is in position corresponding to wind pressure lower than said predetermined maximum.

7. In a wind driven generator structure, a frame pivotally mounted on a vertical axis, a vane for maintaining said frame in a desired position relative to the direction of the wind, a generator pivotally mounted on a vertical axis on said frame, the axis of said generator being on one side of the vertical pivotal axis of said frame and the plane of said vane being on the opposite side thereof, means biasing said generator to remain with its axis of rotation substantially parallel to the plane of said vane, a generator shaft, a propeller on said shaft for rotating it and for swinging the generator out of the wind against such biasing force when the wind pressure against the propeller increases above a predetermined maximum, and means resisting pivotal movement of said frame about its vertical axis.

8. In a wind driven generator structure, a frame pivotally mounted on a vertical axis, a vane for maintaining said frame in a desired position relative to the direction of the wind, a generator pivotally mounted on a vertical axis on said frame, the axis of said generator being on one side of the vertical pivotal axis of said frame, means biasing said generator to remain with its axis of rotation substantially parallel to said plane of said vane, a generator, a propeller on said shaft for rotating it and for swinging the generator out of the wind against such biasing force when the wind pressure against the propeller increases above a predetermined maximum, and means resisting pivotal movement of said frame about its vertical axis.

9. In a device of the class described, a frame, a vane secured thereto, a generator pivoted to extensions on said frame and thereby swingable relative to said frame on a vertical axis, a vertical sleeve and a distributor box on said frame, a mast head telescopically cooperating with said sleeve, distributor mechanism within said distributor box coacting with said mast head to conduct current from said generator to said mast head in all positions of rotation of the frame relative thereto, a generator shaft, and a propeller on the generator shaft for rotating it and for swinging the generator out of the wind when the velocity of the wind exceeds a predetermined velocity.

10. In a device of the class described, a frame, a vane secured thereto, a generator pivoted to extensions on said frame and thereby swingable relative to said frame on a vertical axis, a vertical sleeve and a distributor box on said frame, a mast head telescopically cooperating with said sleeve, distributor mechanism within said distributor box coacting with said mast head to conduct current from said generator to said mast head in all positions of rotation of the frame relative thereto, a generator shaft, a propeller on the generator shaft for rotating it and for swinging the generator out of the wind when the velocity of the wind exceeds a predetermined velocity, and means for manually swinging said generator and propeller out of the wind.

11. In a wind driven generator structure, a frame pivotally mounted on a vertical axis, a wind driven generator pivoted to said frame on a vertical axis and means for swinging said generator out of the wind comprising a member vertically movable relative to said frame and having an arm swingable about a vertical axis, a link connection between said arm and the generator and a second link connection between said arm and the frame, whereby vertical movement of the member will cause swinging of the arm relative to the frame due to the second link connection, thereby causing the first link connection to swing the generator on its pivotal axis relative to said frame.

12. In a device of the class described, a vertical post, a frame pivoted thereon, a generator pivoted on a vertical axis to said frame, a generator shaft, a propeller on said shaft, the axis of said generator being offset relative to the axis of the pivot mounting of the generator to the frame, a vane on said frame and in a plane offset from the plane of the axis of the generator, and means resisting pivotal movement of said frame relative to said post to prevent swinging of said vane out of the wind upon excess wind pressure tending to swing the generator out of the wind.

13. In a wind driven generator structure, generator supporting means, a wind driven generator pivoted to said means on a vertical axis and means for swinging said generator relative to said supporting means comprising a member vertically movable relative to said supporting means and having an arm swingable about a vertical axis, a link connection between said arm and the generator at a point spaced from its pivot axis and a second link connection between said arm and said supporting means, whereby vertical movement of the member will cause swinging of the arm due to the second link connection, thereby causing the first link connection to swing the generator on its pivotal axis.

14. In a device of the class described, a support, a frame pivoted thereon, a generator pivoted to said frame, a generator shaft, a propeller on said shaft, the axis of said generator being offset relative to the axis of the pivot mounting of the generator to the frame, a vane on said frame, and means resisting pivotal movement of said frame relative to said support to prevent swinging of said vane out of the wind upon excess wind pressure tending to swing the generator out of the wind.

15. In a device of the class described, a frame pivoted on a vertical axis, a vane secured to said frame, a generator pivoted to said frame and swingable relative thereto on a vertical axis, means biasing said generator to remain with its axis of rotation substantially parallel to the plane of said vane, a generator shaft, a propeller on said shaft for rotating it and for swinging the generator out of the wind against such biasing force when the wind pressure against the propeller increases above a predetermined maximum, and means resisting pivotal movement of said frame about its vertical axis.

16. In a device of the class described, a frame, a directional vane secured thereto, a generator pivoted thereto on a vertical axis, a distributor box on said frame, a mast head telescopically cooperating with said frame, distributor mechanism within said distributor box coacting with said mast head to conduct current from said generator to said mast head in all positions of rotation of the frame relative thereto, a generator shaft, a propeller on the generator shaft for rotating it and for swinging the generator out of the wind when the wind velocity exceeds a predetermined maximum, and means resisting pivotal movement of the frame, said means being actuated by an increase in wind velocity above said predetermined maximum.

17. In a device of the class described, a frame, a directional vane secured thereto, a generator pivoted thereto and swingable relative to said frame on a vertical axis, a distributor box on said frame, a mast head telescopically cooperating with said frame, distributor mechanism within said distributor box coacting with said mast head to conduct current from said generator to said mast head in all positions of rotation of the frame relative thereto, a generator shaft, a propeller on the generator shaft for rotating it and for swinging the generator out of the wind when the wind pressure against the propeller exceeds a predetermined maximum, and means vertically movable for manually swinging said generator and propeller out of the wind.

18. In a device of the class described, a frame pivoted on a vertical axis, a directional vane secured to said frame and a generator pivoted thereto and swingable relative thereto on a vertical axis, means biasing said generator to remain with its axis of rotation substantially parallel to the plane of said vane, a generator shaft, a propeller on the generator shaft for rotating it and for swinging the generator out of the wind against such biasing force when the wind pressure against the propeller increases above a predetermined maximum, and means resisting pivotal movement of said frame about its vertical axis, the effect of said means being at least partially nullified when said generator is in position corresponding to wind pressure lower than said predetermined wind maximum.

19. In a device of the class described, a frame pivoted on a vertical axis, a vane secured to said frame, a generator pivoted to said frame on a vertical axis, means biasing said generator to remain with its axis of rotation substantially parallel to the plane of said vane, a generator shaft, a propeller on said generator shaft for rotating it and for swinging the generator out of the wind against such biasing force when the wind pressure against the propeller increases above a predetermined maximum, and means resisting pivotal movement of said frame about its vertical axis, the effect of said resisting means being increased in proportion to an increase of the the wind pressure above said predetermined maximum.

20. In a wind driven generator structure, a frame pivotally mounted, a generator pivotally mounted on a vertical axis on said frame, means biasing said generator to remain in a predetermined position relative to said frame, a generator shaft, a propeller on the generator shaft for rotating it and for swinging the generator out of the wind against such biasing force when the wind pressure against the propeller exceeds a predetermined maximum, and means resisting pivotal movement of said frame, the effect of said means being increased in proportion to the degree to which said generator is swung out of the wind.

21. In a wind driven generator structure, a support, a frame member pivotally mounted on said support on a vertical axis and a generator pivotally mounted on said frame member on a second vertical axis spaced from said first axis.

22. In a wind driven generator structure, a support, a frame member pivotally mounted on said support on a first vertical axis and a generator pivoted on said frame member on a second vertical axis spaced from said first vertical axis, said generator having a horizontal shaft spaced in non-intersecting relationship with the said second vertical axis.

23. In a wind driven generator structure, a support, a frame member pivotally mounted on said support on a first vertical axis, a generator pivoted on said frame member on a second vertical axis spaced from said first vertical axis, said generator having a horizontal shaft spaced in non-intersecting relationship with the said second vertical axis, and vertically sliding means operatively connected to said generator for moving it about said second vertical axis.

WILLIAM G. DUNN.

DISCLAIMER 2,102,309.—*William G. Dunn*, Clarinda, Iowa. WIND DRIVEN GENERATOR STRUCTURE. Patent dated December 14, 1937. Disclaimer filed November 3, 1938, by the patentee.

Hereby enters this disclaimer to claims 21, 22, and 23 of said specification.

[*Official Gazette November 29, 1938.*]